United States Patent
Bewlay et al.

(10) Patent No.: US 9,957,066 B2
(45) Date of Patent: May 1, 2018

(54) DETERGENT DELIVERY METHODS AND SYSTEMS FOR TURBINE ENGINES

(71) Applicant: GENERAL ELECTRIC COMPANY, Schenectady, NY (US)

(72) Inventors: Bernard Patrick Bewlay, Niskayuna, NY (US); Ambarish Jayant Kulkarni, Glenville, NY (US); Nicole Jessica Tibbetts, Delanson, NY (US); Brian Michael Ellis, Mayfield, NY (US); Manuel K. Bueno, Syracuse, NY (US); Ever Reyes, Pearland, TX (US); Noel Bates, Duanesburg, NY (US); Brian Kalb, Montgomery, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 441 days.

(21) Appl. No.: 14/621,465

(22) Filed: Feb. 13, 2015

(65) Prior Publication Data
US 2016/0236799 A1  Aug. 18, 2016

(51) Int. Cl.
*B08B 7/00* (2006.01)
*B64F 5/00* (2017.01)
(Continued)

(52) U.S. Cl.
CPC ............ *B64F 5/0018* (2013.01); *B08B 9/032* (2013.01); *B64F 5/30* (2017.01); *F01D 25/002* (2013.01);
(Continued)

(58) Field of Classification Search
None
See application file for complete search history.

(56) References Cited

U.S. PATENT DOCUMENTS

| | | | |
|---|---|---|---|
| 4,167,193 A | 9/1979 | Magnus et al. | |
| 4,377,420 A | 3/1983 | Granatek et al. | |
| (Continued) | | | |

FOREIGN PATENT DOCUMENTS

| | | |
|---|---|---|
| CN | 102307679 A | 1/2012 |
| CN | 103934231 A | 7/2014 |
| (Continued) | | |

OTHER PUBLICATIONS

European Search Report and Written Opinion issued in connection with corresponding EP Application No. 6154844.1 dated Jul. 28, 2016.
(Continued)

*Primary Examiner* — Eric W Golightly
(74) *Attorney, Agent, or Firm* — Nitin N. Joshi

(57) ABSTRACT

Methods and systems for in situ cleaning of internal cooling circuits of a turbine engine with detergent that provide cleaning a turbine engine that includes circumferentially arranged internal impingement cooling circuits that each include a baffle plate configured to air cool a respective surface or component of the turbine engine. Detergent is introduced through the outer wall and proximate to a back side of a baffle plate such that the detergent passes through at least one aperture in the baffle plate and acts at least upon the surface or component that the baffle plate is configured to cool. The detergent may also act on the front side of the baffle plate that is proximate to the surface or component.

18 Claims, 10 Drawing Sheets

(51) Int. Cl.
*F01D 25/00* (2006.01)
*B08B 9/032* (2006.01)
*F01D 25/12* (2006.01)
*B64F 5/30* (2017.01)

(52) U.S. Cl.
CPC ........ *F01D 25/12* (2013.01); *F05D 2220/323* (2013.01); *F05D 2260/221* (2013.01)

(56) References Cited

U.S. PATENT DOCUMENTS

| | | | |
|---|---|---|---|
| 5,002,078 A | 3/1991 | Kaes | |
| 5,248,381 A | 9/1993 | Dunker et al. | |
| 5,279,760 A | 1/1994 | Sato et al. | |
| 5,385,014 A | 1/1995 | Rathbun | |
| 6,311,704 B1 | 11/2001 | Foster | |
| 6,394,108 B1 | 5/2002 | Butler | |
| 7,115,171 B2 | 10/2006 | Powers et al. | |
| 7,185,663 B2 | 3/2007 | Koch et al. | |
| 7,531,048 B2 | 5/2009 | Woodock et al. | |
| 2003/0000217 A1* | 1/2003 | North | F23R 3/002 60/772 |
| 2004/0016449 A1 | 1/2004 | Travaly et al. | |
| 2007/0039175 A1 | 2/2007 | Rucker et al. | |
| 2007/0062201 A1 | 3/2007 | Reback et al. | |
| 2009/0084411 A1* | 4/2009 | Woodcock | B08B 9/00 134/22.18 |
| 2009/0165818 A1* | 7/2009 | Smith | C11D 3/046 134/7 |
| 2010/0129544 A1 | 5/2010 | Ott et al. | |
| 2010/0152086 A1 | 6/2010 | Wu et al. | |
| 2010/0178158 A1 | 7/2010 | Fish et al. | |
| 2011/0259375 A1 | 10/2011 | Gebhardt et al. | |
| 2013/0019895 A1 | 1/2013 | Hughes et al. | |
| 2013/0174869 A1 | 7/2013 | Roesing et al. | |
| 2013/0192257 A1* | 8/2013 | Horine | F01D 11/08 60/796 |
| 2013/0199040 A1 | 8/2013 | Dudeck et al. | |
| 2014/0190347 A1 | 7/2014 | Wong et al. | |
| 2014/0202498 A1 | 7/2014 | Bellino et al. | |
| 2015/0159122 A1 | 6/2015 | Tibbetts et al. | |

FOREIGN PATENT DOCUMENTS

| | | |
|---|---|---|
| EP | 1225307 A2 | 7/2002 |
| EP | 2547872 A1 | 1/2013 |
| GB | 758530 A | 10/1956 |
| WO | 2006131689 A1 | 12/2006 |
| WO | 2007027522 A2 | 3/2007 |
| WO | 2009129788 A3 | 10/2009 |
| WO | 2010054132 | 5/2010 |

OTHER PUBLICATIONS

Unofficial English Translation of Chinese Office Action issued in connection with corresponding CN Application No. 201610079275 dated Jan. 24, 2017.

* cited by examiner

DETERGENT DELIVERY METHODS AND SYSTEMS FOR TURBINE ENGINES

The present application relates generally to methods and system for internal cleaning of turbine engines, and more particularly to methods and system of cleaning internal cooling circuits of turbine engines with detergent.

Turbines, such as gas turbine engines, typically include internal cooling passages that are designed to impingement cool one or more components during use. For example, the high pressure section of a gas turbine engine typically includes numerous circumferentially-arranged impingement internal cooling circuits that allow for higher temperatures in the turbine. Unfortunately, impingement internal cooling circuits of turbine engines tend to become partially or completely blocked with particulate matter that reduces the cooling efficiency of the circuits. For example, particulate matter may enter a turbine engine during service or during use, such as during environmental events such as dust storms. The particulate matter may be fine scale (e.g., less than 10 microns) dust, debris or other pollutants (reacted or non-reacted). In addition to blocking or clogging the cooling circuits, the particulate matter may also become deposited on cooled components and create an insulating layer between the surface of the component and the cooling medium of the cooling circuits. The reduced cooling efficiency created by the at least partially blocked cooling circuits and the insulating layers on the cooled components can increase the operating temperature and reduce the life of the components. In addition, the particulate matter that is entrained in the air that enters the turbine engine and travels within the cooling circuits can contain sulphur-containing species which can corrode components of the turbine.

Unfortunately, internal cooling passages that are designed to cool one or more components of gas turbine engines are typically either not cleaned or cleaned through expensive, time consuming, labor intensive and/or ineffective means. For example, turbine engines may be removed from service (e.g., detached from the aircraft, power plant or other machine that the engine powers or is otherwise used with) and substantially dismantled to provide direct access to the internal cooling passages for cleaning. In this way, traditionally, if cleaned, the circumferentially arranged cooling circuits are cleaned individually and not in situ.

SUMMARY OF THE INVENTION

It is therefore highly desirable to be able to clean the internal cooling circuits of gas turbine engines to remove the particulate matter that can accumulate. For example, cleaning the internal cooling circuits of a gas turbine engine to return the cooling efficiency of the circuits to their original condition before entry into service, or close thereto, is substantially beneficial. It is also highly desirable to achieve a cleaning operation that is capable of cleaning all of the circumferentially arranged internal cooling circuit system within the engine. As many gas turbine engines are utilized by aircraft, it is necessary that the cleaning operation used for removal of particulate matter that has become accreted within cooling circuits be compliant with all Federal Aviation Administration (FAA) and other travel or aviation regulations. Still further, a cleaning operation that is performed while the gas turbine is in its installed state (such as an aircraft engine installed on the aircraft or a power generating gas turbine installed in a power plant), or at least without substantial disassembly, is needed.

In one aspect, the present disclosure provides a method of cleaning a turbine engine that includes at least one internal impingement cooling circuit with a baffle plate configured to air cool a component of the turbine engine. The method includes introducing detergent to a back side of a baffle plate of the turbine engine such that the detergent passes through at least one aperture in the baffle plate and acts at least upon the component that the baffle plate is configured to air impingement cool to clean matter from the component.

Introducing detergent to a back side of a baffle plate of the turbine engine may comprise introducing detergent into a pre-baffle cavity positioned proximate to the back side of the baffle plate. The method may further include accessing the back side of the baffle plate of the turbine engine through a port in an outer wall of the turbine engine. The port in the outer wall of the turbine engine may provide a passageway to an internal cooling air channel of a respective internal impingement cooling circuit that feeds the baffle plate with air to air cool the component. The port may be an aperture in an outer case of the turbine engine configured to house a fuel line coupled to a fuel nozzle. Accessing a back side of a baffle plate of the turbine engine through a port in an outer wall of the turbine engine may include positioning a detergent delivery mechanism through the port and proximate to the back side of the baffle plate.

The impingement-cooled component may be a shroud coupled to a shroud hanger positioned at least partially on the back side of the shroud. The detergent may be passed through at least one aperture in the hanger and may be introduced into a pre-baffle cavity between the hanger and the back side of the shroud.

The detergent may act on a front side of the baffle plate that substantially faces the component that the baffle plate is configured to air impingement cool. The detergent may include an acidic, water-based reagent including an organic surfactant and a corrosion inhibitor designed to selectively dissolve at least one of sulfate, chloride and carbonate based species while being substantially unreactive with the material forming the component. The turbine engine may be attached to an aircraft. The internal impingement cooling circuits may include a plurality of circumferentially arranged cooling circuits each including a baffle plate configured to cool a respective one of circumferentially arranged components. The method may include substantially simultaneously introducing detergent to the back side of a plurality of the circumferentially arranged baffle plates such that the detergent passes through apertures in the baffle plates and acts at least upon the respective circumferentially arranged components that the baffle plates are configured to air cool. The cleaning method may include introducing detergent to a back side of a baffle plate of the turbine engine such that the detergent passes through a plurality of apertures in the baffle plate to form a plurality of discrete jets of detergent that act at least upon the component that the baffle plate is configured to air impingement cool to clean matter from the component.

In another aspect, the present disclosure provides a method of cleaning a turbine engine. The method includes obtaining a turbine engine including circumferentially arranged internal impingement cooling circuits each with a baffle plate configured to air impingement cool a respective circumferentially arranged component of the turbine engine, wherein the baffle plates each include a back side, a front side positioned proximate to the respective component, and at least one aperture extending from the front side to the back side. The method further includes positioning a detergent delivery mechanism through at least one access aperture in the outer wall of the turbine and proximate to the back side of the baffle plates. The method also includes introducing detergent to the back side of the baffle plates via the detergent delivery mechanism such that the detergent passes through the at least one aperture in the baffle plates and acts upon the components and the front sides of the baffle plates to clean matter therefrom.

The components may be circumferentially arranged shrouds each coupled to a shroud hanger positioned at least partially on the back side of the shrouds, and the method may include passing the detergent through an aperture in each of the hangers and into a pre-baffle cavity formed between the hangers and the back sides of the baffle plates. The aperture in each of the hangers may be in communication with the respective internal cooling passageway of the respective circumferentially arranged internal impingement cooling circuit to feed air to the respective baffle plate to air cool the respective component.

The turbine engine may be attached to an aircraft. The detergent may include an acidic, water-based reagent including an organic surfactant and a corrosion inhibitor designed to selectively dissolve at least one of sulfate, chloride and carbonate based species while being substantially unreactive with the material forming the components.

In another aspect, the present disclosure provides a system for cleaning a turbine engine that includes at least one internal impingement cooling circuit with an internal cooling passageway in communication with a baffle plate that is configured to air cool a component of the turbine engine. The system includes a detergent delivery mechanism extending through an opening in the outer wall of the turbine and proximate to a back side of the baffle plate. The system further includes a source of detergent including an acidic, water-based reagent with an organic surfactant and a corrosion inhibitor in fluid communication with the detergent delivery mechanism.

The component may be a shroud coupled to a shroud hanger positioned at least partially on the back side of the shroud, and the detergent delivery mechanism may extend to an aperture in the shroud hanger to deliver the detergent into a pre-baffle cavity that is formed between the shroud hanger and the back side of the baffle plate. The detergent delivery mechanism may extend to a pre-baffle cavity that is proximate to a back side of the baffle plate. The source of a detergent including an acidic, water-based reagent may be configured to deliver the detergent to the back side of the baffle via the detergent delivery mechanism such that the delivered detergent passes through apertures in the baffle plate and acts upon the component and a front side of the baffle plate to clean matter from therefrom.

These and other objects, features and advantages of this disclosure will become apparent from the following detailed description of the various aspects of the disclosure taken in conjunction with the accompanying drawings.

DETAILED DESCRIPTION

Figure 1:
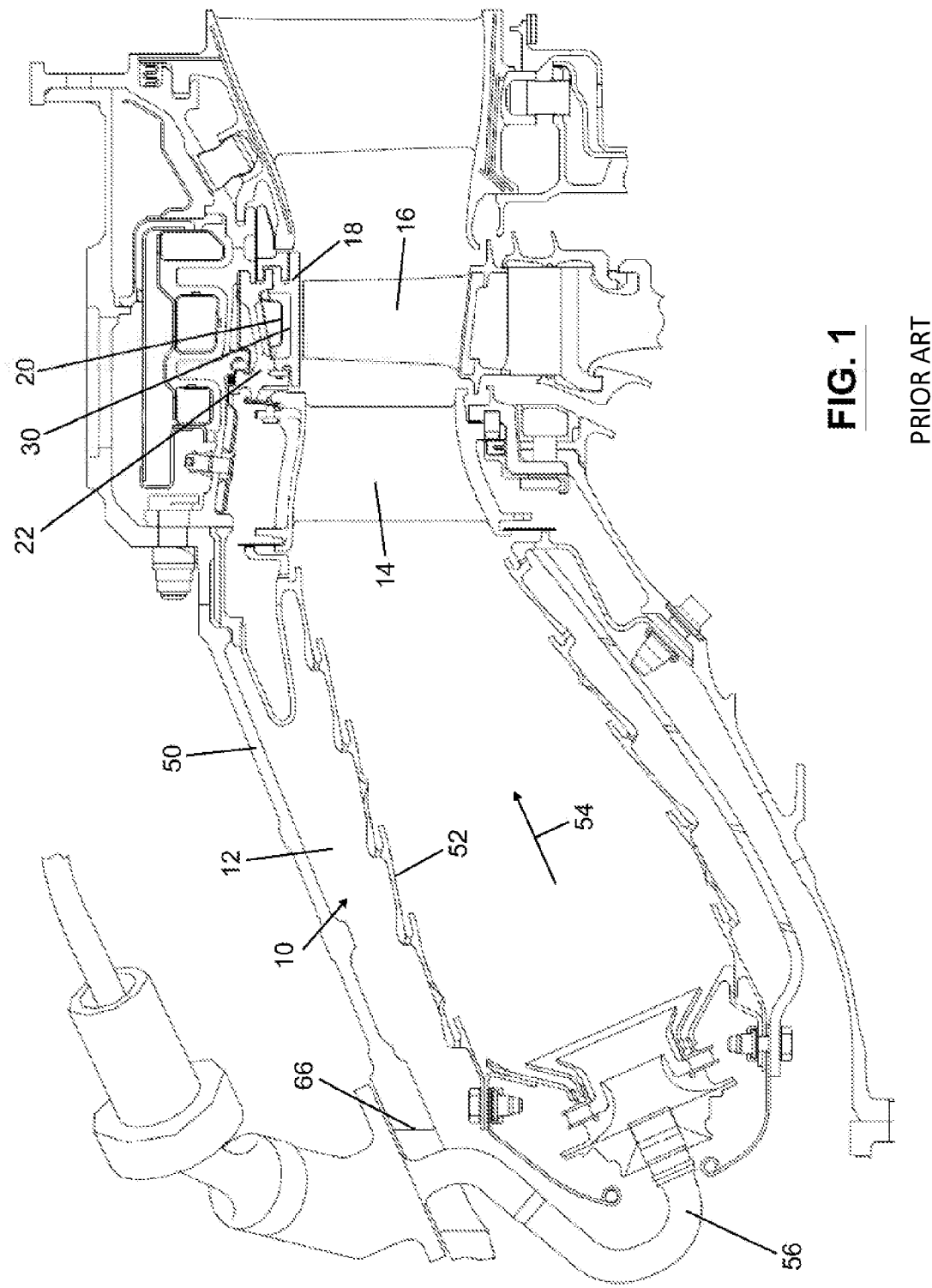
FIG. 1 is a cross-sectional view of an exemplary internal impingement cooling circuit for a shroud of an exemplary turbine engine.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular seal embodiment may similarly be applied to any other seal embodiment disclosed herein.

Methods and systems according to the present disclosure provide for in situ uniform circumferential cleaning of the internal impingement cooling circuits of a turbine engine (i.e., cleaning around the full circumference of the turbine), without substantial disassembly of the engine, with detergent to remove matter therefrom to restore or improve the cooling efficiency of the circuits, and thereby the performance of the turbine. For example, the methods and systems of cleaning internal impingement cooling circuits of a turbine engine according to the present disclosure may be effective in returning the cooling features of the components that the internal impingement cooling circuits are configured to impingement cool to their original condition before entry into service. The cleaning methods and systems according to the present disclosure may also provide for removal of matter from the components of the internal impingement cooling circuit and/or the components or surfaces that the internal impingement cooling circuits are configured to impingement cool that includes the most (or the most difficult to remove) matter deposited thereon so that the performance, lifespan or function of the component is substantially corrected or fully restored. For example, the methods and systems according to the present disclosure may provide for cleaning the "dirtiest" impingement cooling circuit (such as the circuit including the "dirtiest" impingement cooled component) of the circumferentially arranged impingement cooling circuits to ensure that the entirety of the circumferentially arranged impingement cooling circuits are corrected or restored. Similarly, for each individual impingement cooling circuit and/or for each component that the internal impingement cooling circuits are configured to impingement cool, the methods and systems according to the present disclosure may provide for effective cleaning of the region of each circuit and/or cooled component that is the "dirtiest" so that the performance, life span and/or function of even the worst area of the circuit and/or cooled component is substantially corrected or restored to an acceptable level for effective impingement cooling during use of the turbine.

The methods and systems of cleaning turbine internal impingement cooling circuits according to the present disclosure may be configured to clean internal cooling passages of a gas turbine engine with detergent by delivering the detergent through one or more access, ports or aperture in the outer wall of the turbine without substantial disassembly of the turbine engine. In some embodiments, the turbine internal impingement cooling circuit cleaning methods and systems may be configured to deliver cleaning detergent in passages of the impingement cooling circuits that typically operate at air pressures of up to 1,000 psi during normal or typical turbine engine service. The methods and systems of cleaning turbine internal impingement cooling circuits according to the present disclosure may utilize the baffle plate system of internal impingement cooling circuits (i.e., baffle plates that are used in for impingement cooling) to deliver detergent to components that the baffle plates are configured to cool to improve cleaning efficiency of the components.

While the methods and systems of cleaning internal impingement cooling circuits of a turbine engine according to the present disclosure are described in detail below with respect to particular internal impingement cooling circuits that are configured or designed to impingement air cool particular components (e.g., shrouds), the internal impingement cooling circuit cleaning methods and systems of the present disclosure may equally be applied to other impingement cooling circuits configured to cool other components of a turbine engine that are (or may be) impingement air cooled, such as nozzles, vanes, heat shields (such as combustor heat shields), blades, splashplates, etc. Further, although the methods and systems of cleaning turbine internal impingement cooling circuits according to the present disclosure are described in detail below with respect to internal cooling passages of the high pressure section or portion of a gas turbine engine, the cleaning methods and systems may equally be applied to other sections or portions of turbine engines with impingement cooling.

As such, an internal impingement cooling circuit of a turbine engine that is utilized to clean a turbine engine, as disclosed herein, may be any turbine cooling circuit that includes a pre-impingement baffle cavity or plenum, a baffle or baffle plate with at least one aperture therethrough, and a post-baffle cavity that, collectively, are configured to impingement cool a component, surface or portion of the turbine engine, typically during operation of the turbine engine. The pre-baffle cavity is arranged or positioned upstream of the impingement baffle plate and is configured to feed cooling air or other material through the at least one aperture in the baffle plate, and the post-baffle cavity is arranged or positioned downstream of the baffle and proximate or adjacent to the impingement cooled component or surface. The term baffle or baffle plate is used herein to refer to any component, portion, surface or mechanism that includes at least one aperture extending therethrough that acts to generate at least one discrete cooling jet that impinges on a surface or component in the post-baffle cavity of an internal impingement cooling circuit of a turbine engine to cool the surface or component. As such, the baffle plate discussed below with respect to FIGS. 1-9 (with an impingement cooled shroud) is only one exemplary baffle plate embodiment, and any other component, portion, surface or mechanism that includes at least one aperture extending therethrough that acts to generate at least one discrete cooling jet that impinges on a surface or component in a post-baffle cavity of an internal impingement cooling circuit of a turbine engine maybe utilized in the cleaning methods and systems disclosed herein.

There are a wide range of geometries and configurations of substantially enclosed volumes that serve as pre-baffle and post-baffle cavities, as well as components, portions, surfaces or mechanisms that act as a baffle plate, of differing internal impingement cooling circuit in turbines. Any arrangement of a pre-baffle cavity, at least one aperture that generates a discrete cooling jet (referred to in general herein as a baffle plate), and a component or surface that is impingement cooled by the at least one discrete jet in the post-baffle cavity may be utilized by the methods and systems described herein to clean a turbine. In such cleaning methods and systems, detergent is introduced into or otherwise enters a pre-baffle cavity or plenum of at least one internal impingement cooling circuit, and passes through the at least one aperture in the baffle to clean material from a component or surface of the turbine, such as the component or surface that the at least one internal impingement cooling circuit typically or otherwise impingent cools.

In this way, the methods and systems of cleaning internal impingement cooling circuits of the present disclosure are configured to employ a pre-existing impingement cooling configuration to establish suitable detergent flow conditions that effectively and efficiently clean foreign material from the full area of the impingement cooled surface or component. Stated differently, effective and efficient cleaning according to the present disclosure is performed by "spraying" detergent through a pre-existing baffle plate that is used in a turbine engine for impingement cooling to clean the impingement-cooled internal component or surface of the turbine. The inventors have determined that the detergent jets can be configured such that each cleaned surface or component of the internal impingement cooling circuits is cleaned uniformly over the full area of the impingement cooled surface or component. The inventors have also determined that in turbines that include circumferentially arranged or positioned internal impingement cooling circuits, each of the cooling circuits around the full circumference of the engine can be cleaned uniformly (i.e., each impingement cooling circuit provides at least a minimum cleaning efficiency that is effective in removing foreign material from the full area of the impingement cooled surface or component).

A number of factors that affect the efficiency and effectiveness of the methods and systems of the present disclosure to clean foreign matter from the cooled components or surfaces of a turbine engine have been recognized. For example, the inventors have determined that the delivery pressure of the detergent in the pre-baffle cavity, the flow rate of the detergent through the aperture(s) of the baffle plate, the number of apertures in the baffle plate, the velocity of the detergent when it exits the baffle plate, the velocity of the detergent when it impacts the matter on the cooled component or surface, and the shear stress generated in the matter by the detergent each affect the efficiency and effectiveness of utilizing detergent and impingement cooling circuits to clean foreign matter from the cooled components or surfaces. The pattern of apertures in baffle plates that include a plurality of apertures, for example, has been determined to affect the distribution of the resulting detergent jets on the cooled component or surface and how the jets impact the matter on the cooled component or surface. In fact, it has been determined that the angle of impingement of a detergent jet is a factor in whether or not the jet generates an appropriate impact against the matter on the component or surface and thereby removes the matter therefrom. The angle of the axis of the baffle apertures in typical impingement cooling circuits may be oriented normal to the surface or component that is cooled (and therefore cleaned), or may be angled with respect to the surface or component that is cooled (and therefore cleaned). For example, the angle of the axis of baffle apertures used in the cleaning methods and systems disclosed herein may be within the range of about 30 degrees to about 90 degrees with respect to the surface or component that is cooled (and therefore cleaned). As the aperture configuration of baffle plates in turbine engines is typically configured based on air cooling efficiency, the cleaning methods and systems of the present disclosure provide for full and uniform cleaning utilizing such pre-existing cooling-designed apertures.

The methods and systems of cleaning turbine internal impingement cooling circuits according to the present disclosure may be effective in substantially removing foreign matter from the components in which the cooling circuits are configured or designed to impingement cool and/or components or aspects of the cooling circuits themselves. The foreign matter may be any matter, such as particulate matter, that is built up, introduced or produced on or in one or more component or surface of the turbine engine during use of the engine that decrease the efficiency of the turbine or otherwise interfere or degrade one or more function or component of the turbine. In this way, the foreign matter cleaned by the methods and systems disclosed herein may be any matter that is deposited and/or produced on components or surfaces of the turbine after initial manufacture of the turbine that interfere with the proper, designed or ideal efficiency, function or lifespan of the turbine as a whole and/or one or more component or sub-system of the turbine. For example, the foreign matter cleaned by the methods and systems disclosed herein may be dust, sand, dirt, debris or other foreign matter or pollutant that is ingested or otherwise introduced into the engine and deposited or adhered onto one or more component or surface of an impingement cooling circuit and/or a component or surface that the impingement cooling circuit is configured or designed to cool. The foreign matter may also include matter that was introduced into the engine and that has been reacted, treated or otherwise altered by the heat, pressure, etc. within the engine. The foreign matter is a combination of soluble and insoluble dust species that have been ingested by a turbine engine and deposited (e.g., built up over time) on one or more component or surface of an impingement cooling circuit and/or a component or surface that the impingement cooling circuit is configured to cool.

The methods and systems of cleaning turbine internal impingement cooling circuits according to the present disclosure may utilize one or more detergent including a reagent composition that is effective in removing matter that may be deposited or formed on underlying components or surfaces of turbine internal impingement cooling circuits (including the impingement cooled components or surfaces themselves). For example, the methods and systems of cleaning turbine internal impingement cooling circuits according to the present disclosure may utilize a detergent that is effective in removing oxide-based, chloride-based, sulfate-based, and/or carbon-based constituents of CMAS-based reaction products, interstitial cement, and/or subsequent layers of accumulated mineral dust from turbine components, such as a detergent disclosed in U.S. patent application Ser. No. 14/484,897, filed Sep. 12, 2014. More specifically, the methods and systems of cleaning turbine internal impingement cooling circuits according to the present disclosure may utilize a detergent including a reagent that selectively dissolves the constituents of foreign material in internal cooling passages of a turbine engine. As used herein, "selectively dissolve" refers to an ability of the detergent to be reactive with certain predetermined materials, and to be substantially unreactive with materials other than the predetermined materials. Specifically, the term "selectively dissolve" is used herein with respect to the cleaning detergent of the systems and methods of the present disclosure to refer to a detergent with a reagent composition that reacts with foreign matter on underlying components within a turbine engine to facilitate removal of reacted and unreacted foreign material from the underlying turbine components, but that is substantially unreactive with the material used to form the underlying turbine components to limit damage to them during removal of the foreign matter (i.e., during a cleaning operation).

In some embodiments, the detergent may include an acidic, water-based cleaning reagent including one or more organic surfactant and corrosion inhibitor designed to selectively dissolve sulfate, chloride and carbonate based species of matter on turbine components while being substantially unreactive with the material forming the turbine components, such as metallic turbine components. In some embodiments, the metallic components may consist of nickel alloys, cobalt based alloys, and/or steels. The reagent composition of the detergent may include water within a range between about 25 percent and about 70 percent by volume of the reagent composition, an acidic component within a range between about 1 percent and about 50 percent by volume of the reagent composition, and an amine component within a range between about 1 percent and 40 percent by volume of the reagent composition. The detergent may be formed, at least in part, by diluting the reagent composition with water up to a factor of 40. It is believed, without being bound by any particular theory, that the acidic component of the detergent is a primary driver that facilitates selective dissolution of the oxide-based, chloride-based, sulfate-based, and carbon-based constituents of the foreign material. Exemplary acidic components include, but are not limited to, citric acid, glycolic acid, poly acrylic acid, and combinations thereof. It is also believed, without being bound by any particular theory, that the amine component of the detergent acts as a surfactant that facilitates reducing the surface tension between the cleaning solution and the foreign material. Exemplary amine components include, but are not limited to, monoisopropanol amine and triethanol amine.

Internal impingement cooling circuits or passages 10 of an exemplary gas turbine engine in which the cleaning methods and systems of the present disclosure may be employed are shown in FIGS. 1-5. The internal impingement cooling circuits 10 may be positioned in a high pressure section of the turbine engine. For example, as shown in FIG. 1 an exemplary internal impingement cooling circuit 10 may be proximate (e.g., extending at least partially about) at least one first stage nozzle 14 and at least one first stage blade 16 and configured to impingement air cool at least one portion or surface 30 of at least one first stage shroud 18 associated with the at least one first stage blade 16 (i.e., the at least one shroud 18 is the component in which the internal impingement cooling circuit 10 is designed or configured to cool). As noted above however, the internal impingement cooling circuit 10 is only exemplary and the present disclosure may equally apply to other impingement cooled components of a turbine engine (i.e., components other than a first stage shroud 18) as recognized by one of ordinary skill in the art.

Figure 2:
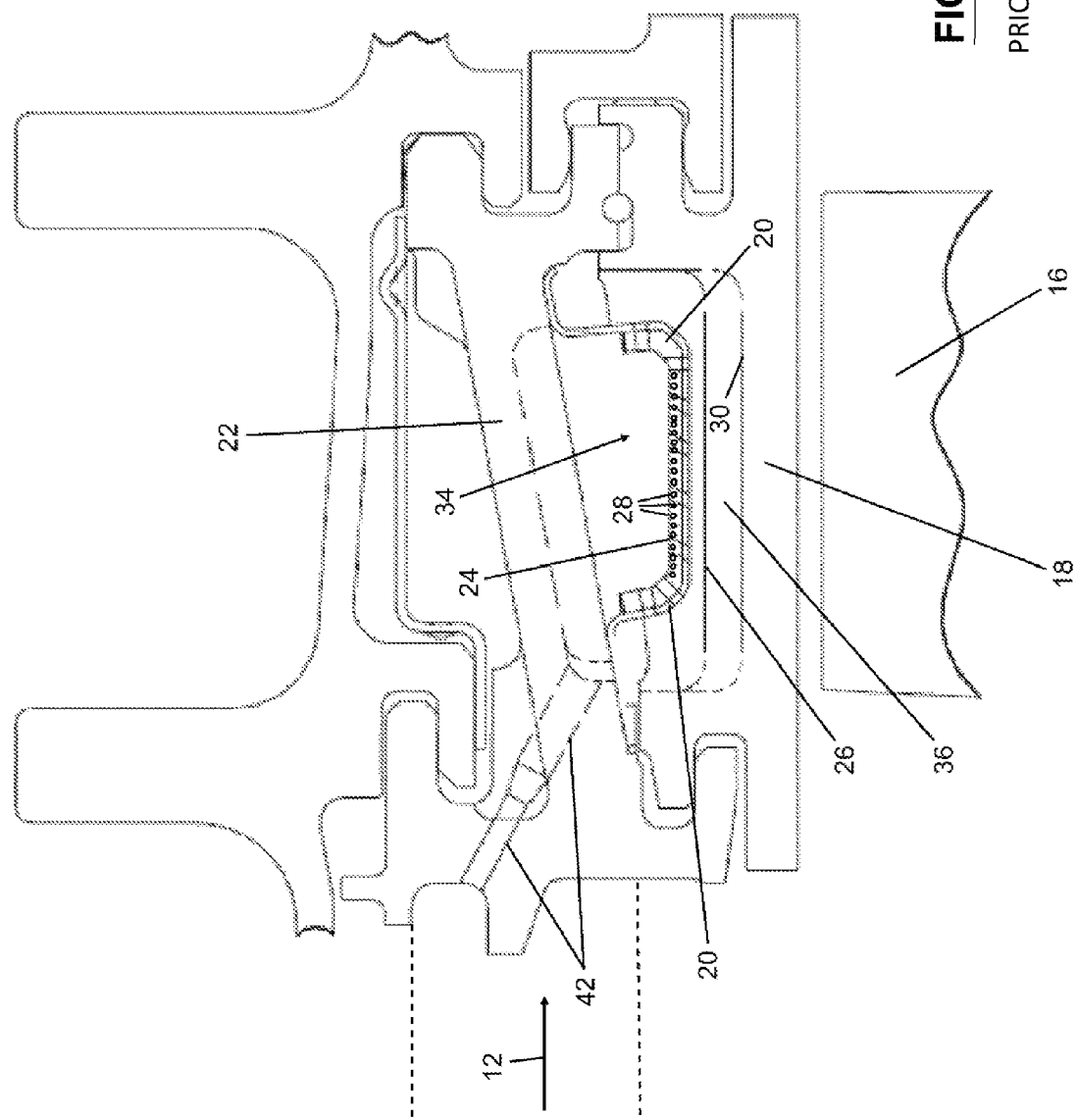
FIG. 2 is an enlarged cross-sectional view of a portion of the baffle plate portion of the exemplary internal impingement cooling circuit of FIG. 1.

The internal impingement cooling circuit 10 may include, define or form an internal cooling passageway 12 for directing a flow of cooling air to at least one back side surface 30 of at least one impingement baffle plate 20 positioned adjacent the cooled component (i.e., the at least one shroud 18), as shown in FIGS. 1 and 2. In this way, the internal cooling passageway 12 of the impingement cooling circuit 10 feeds air to the baffle plate 20 that, ultimately, impinges air onto the backside 30 of the shroud 18 to cool the shroud 18. The cooling passageway 12 may extend generally in a forward-to-aft direction. The internal cooling passageway 12 may be provided or formed between an outer or exterior wall or casing 50 and an inner wall or casing 52 of the engine, as shown in FIG. 1. The outer wall 50 of the engine may thereby isolate or otherwise prevent the internal cooling passageway 12 from being accessed from the exterior of the engine. In this way, the outer wall 50 of the engine must be breached or otherwise "opened" to provide an aperture for access or a passageway into the internal cooling passageway 12. The inner wall 52 may define or form, at least partially, a combustion pathway 54 extending from a fuel nozzle 56 that feeds fuel to the first stage of the engine (i.e., the first stage nozzles 14 and blades 16). In this way the cooling passageway 12 may extend at least partially about, along or exterior to the combustion pathway 54.

As shown in FIG. 2 and discussed above, the internal cooling passageway 12 may feed or otherwise be in fluid communication with at least one baffle plate 20 of the internal impingement cooling circuit 10. In some embodiments, the baffle plate 20 may be coupled to or held by at least one hanger member 22 positioned proximate to a back side or exterior-facing surface 24 of the baffle plate 20. In some embodiments, the hanger member 22 may "hold" or otherwise be coupled to a plurality of baffle plates 20. The hanger member 22 and the baffle plate 20 may form a pre-baffle cavity, plenum or space 34 between the hanger member 22 and the back side 24 of the baffle plate 20, as shown in FIG. 2. The pre-baffle cavity 34 (and/or the internal cooling passageway 12) may be substantially airtight such that the cooling air (fed by the internal cooling passageway 12) is pressurized in the pre-baffle cavity 34. In some embodiments, the cooling air in the pre-baffle cavity 34 and/or the internal cooling passageway 12, while the turbine engine is in service, may operate at pressures up to about 1,000 psi.

In order for the cooling air to feed into the pre-baffle cavity 34 from the internal cooling passageway 12, the hanger member 22 may include or define at least one aperture or passageway 42 extending through the hanger member 22 from the internal cooling passageway 12 to the pre-baffle cavity 34. In this way, the pre-baffle cavity 34 and the internal cooling passageway 12 may be in fluid communication via the at least one aperture 42. The at least one aperture 42 in the hanger member 22 may be configured to provide a sufficient flow rate, pressure and other characteristics or conditions of cooling air in the pre-baffle cavity 34 such that the baffle plate 20 effectively impingement air cools at least one backside, cooling side or portion 30 of the at least one shroud 18.

Figure 3:
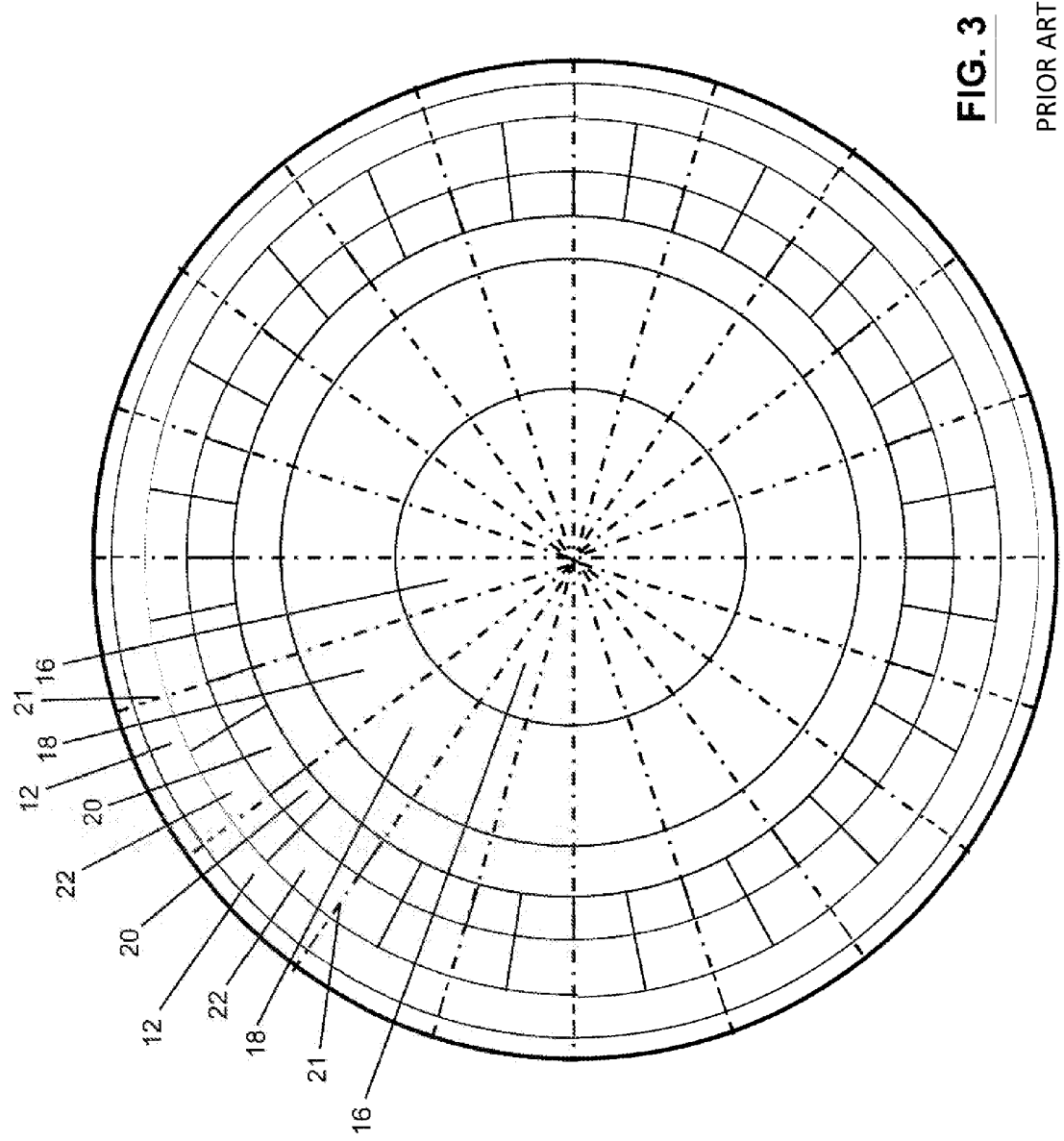
FIG. 3 illustrates a graphical representation of an exemplary circumferential arrangement of internal impingement cooling circuits and related components of a turbine engine.

As shown in FIGS. 2 and 3, the baffle plate 20 may include at least one (such as a plurality or array) of aperture or passageway 28 extending through the baffle plate 20 from the pre-baffle cavity 34 proximate to the back side 24 to a post-baffle cavity 36 proximate a front side 26 of the baffle plate 20. The front side 26 of the baffle plate 20 may substantially oppose the back side 24 of the baffle plate 20. The front side 26 of the baffle plate 20 may be proximate or adjacent to the surface or portion 30 of the component 18 in which the internal impingement cooling circuit 10 is designed or configured to impingement cool during service of the turbine engine. In this way the post-baffle cavity 36 may extend between the front side 26 of the baffle plate 20 and the surface or portion 30 of the component 18 in which the internal impingement cooling circuit 10 is designed or configured to impingement cool. As shown in FIGS. 1-5, the impingement cooling circuit 10 may be designed or configured to impingement cool at least one shroud 18, and therefore the front side 26 of the baffle plate 20 (and the post-baffle cavity 36) is proximate or adjacent to a back side or portion 30 of the shroud 18 and otherwise configured such that cooling air passing through the plurality of apertures 28 of the baffle plate 20 into the post-baffle cavity 36 is impinged onto the back side 30 of the shroud 18. In this way, the plurality of apertures 28 in the baffle plate 20 may effectuate cooling of at least a surface 30 of a component 18 in the post-baffle cavity 36 by air impingement cooling to cool a component 18 that needs to be, or benefits from being, cooled.

It is noted that the impingement cooling circuit 10 may be designed to optimize or otherwise provide efficient, effective and/or above a pre-determined minimum level of cooling to the components 18 that the impingement cooling circuit 10 is designed to cool (e.g., at least one shroud, nozzle, etc.). For example, the delivery pressure of the cooling air in the pre-baffle cavity 34, the flow rate of the cooling air through the baffle plate 20, the number, arrangement/pattern, size, angulation, shape, etc. of the apertures 28 in the baffle plate 20, the velocity of the cooling air when it exits the back side 26 of the baffle plate 20 into the post-baffle cavity 36, the velocity of the cooling air when it impacts the surface or portion 30 of the impingement cooled component(s) 18 in the post-baffle cavity 36 (e.g., the back side 30 of at least one shroud 18), and the like may be designed to provide optimum impingement cooling efficiency to the impingement cooled component(s) 18.

As the methods and systems of cleaning turbine internal impingement cooling circuits according to the present disclosure utilize existing impingement cooling circuits 10, the methods and systems may be configured to generate or establish suitable cleaning detergent flow geometry, characteristics or other conditions over the full area or surface 30 of the impingement cooled component 18 to clean dust, sand, debris 38 or other matter utilizing the impingement cooling circuits 10 that are configured, designed or optimized primarily or solely for cooling. Stated differently, as existing impingement cooling circuits 10 are designed based on air cooling efficiency, the methods and systems of cleaning turbine internal impingement cooling circuits according to the present disclosure may be configured to utilize such designs or configuration for optimum cleaning. However, the impingement cooling circuits 10 (including the baffle plates 20) of the methods and systems of cleaning a turbine according to the present disclosure may include designing configuring and/or utilizing impingement cooling circuits 10 (including the baffle plates 20) designed, configured or otherwise suited to balance impingement cooling during turbine operation, and impingement cleaning of the impingement cooled-component 18.

An impingement cooling circuit 10 configured, designed or optimized primarily or solely for cooling may include a baffle plate 20 with a back side 26 that is spaced within the range of about 0.05 inches to about 0.5 inches from the adjacent or proximate surface 30 of the impingement-cooled component 18. In contrast, an impingement cooling circuit 10 configured, designed or optimized to balance impingement cooling and impingement cleaning of a turbine component may include a baffle plate 20 with a back side 26 that is spaced within the range of about 0.1 inches to about 0.25 inches from the adjacent or proximate surface 30 of the impingement-cooled component 18.

As illustrated in the graphical representation of FIG. 3, a turbine engine typically includes a plurality of circumferentially arranged internal cooling circuits. Thus, the internal cooling circuit 10 shown in FIGS. 1 and 2 and described above represents one of numerous circuits that may be circumferentially arranged in a turbine. The circumferentially arranged internal cooling circuits 10 may thereby each include a passageway 12 for the cooling air, at least one baffle plate 20, and at least one component 18 air impingement cooled by the baffle plate 20. In this way, FIG. 3 graphically illustrates turbine engine with circumferentially arranged internal cooling circuits 10 each including a passageway 12 for the cooling air, a shroud hanger 22, a pair of baffle plates 20, and at least one shroud 18 cooled by the pair of baffle plates 20. The pair of baffle plates 20 may be supported or coupled to a hanger 20 such that a centerline or midline 21 of each hanger 20 is substantially aligned with the junction of the pair of baffle plates 20.

Figure 4:
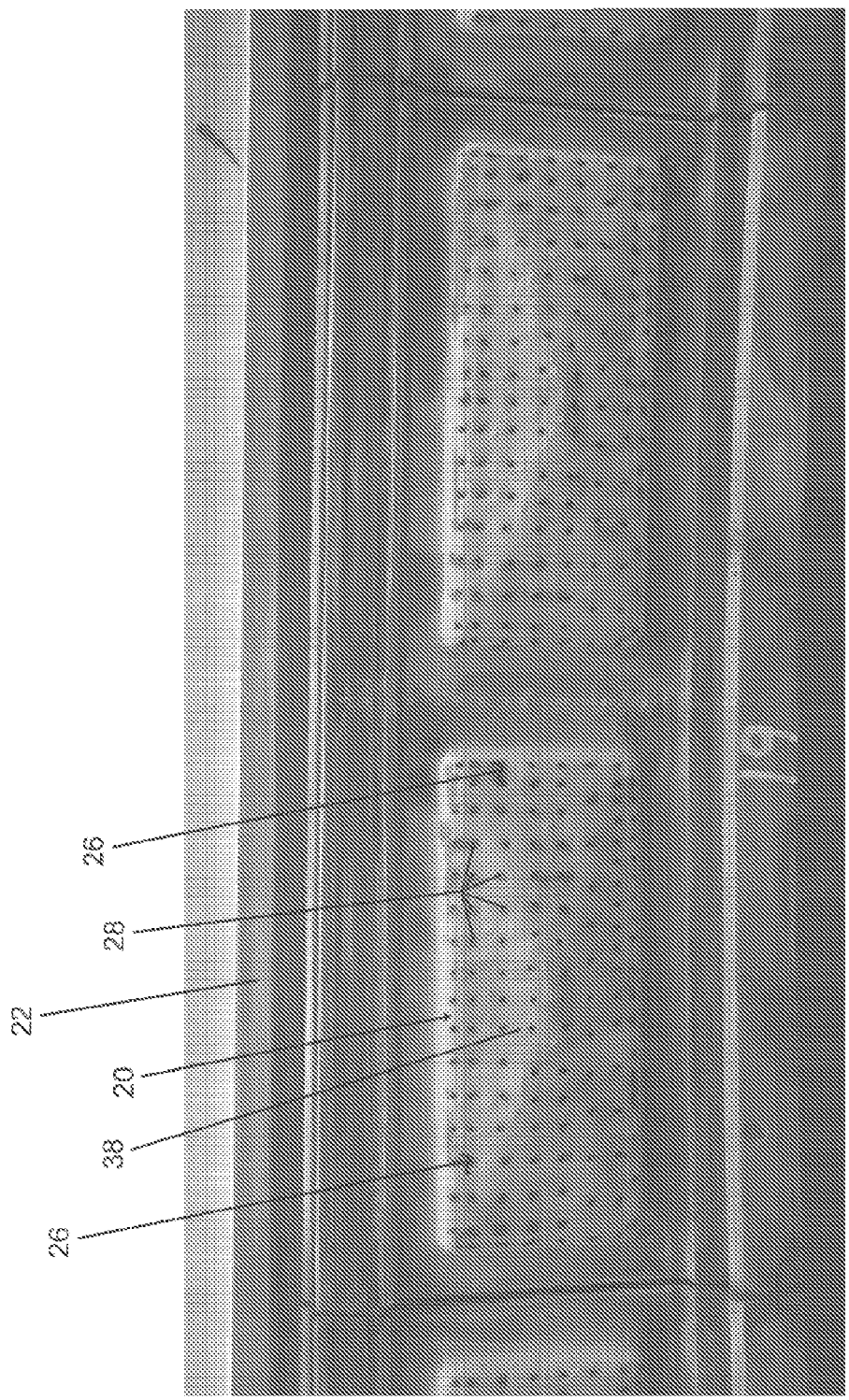
FIG. 4 is an elevational view of exemplary baffle plates of an exemplary internal impingement cooling circuit with particulate matter built up on the post-baffle side thereof.
Figure 5:
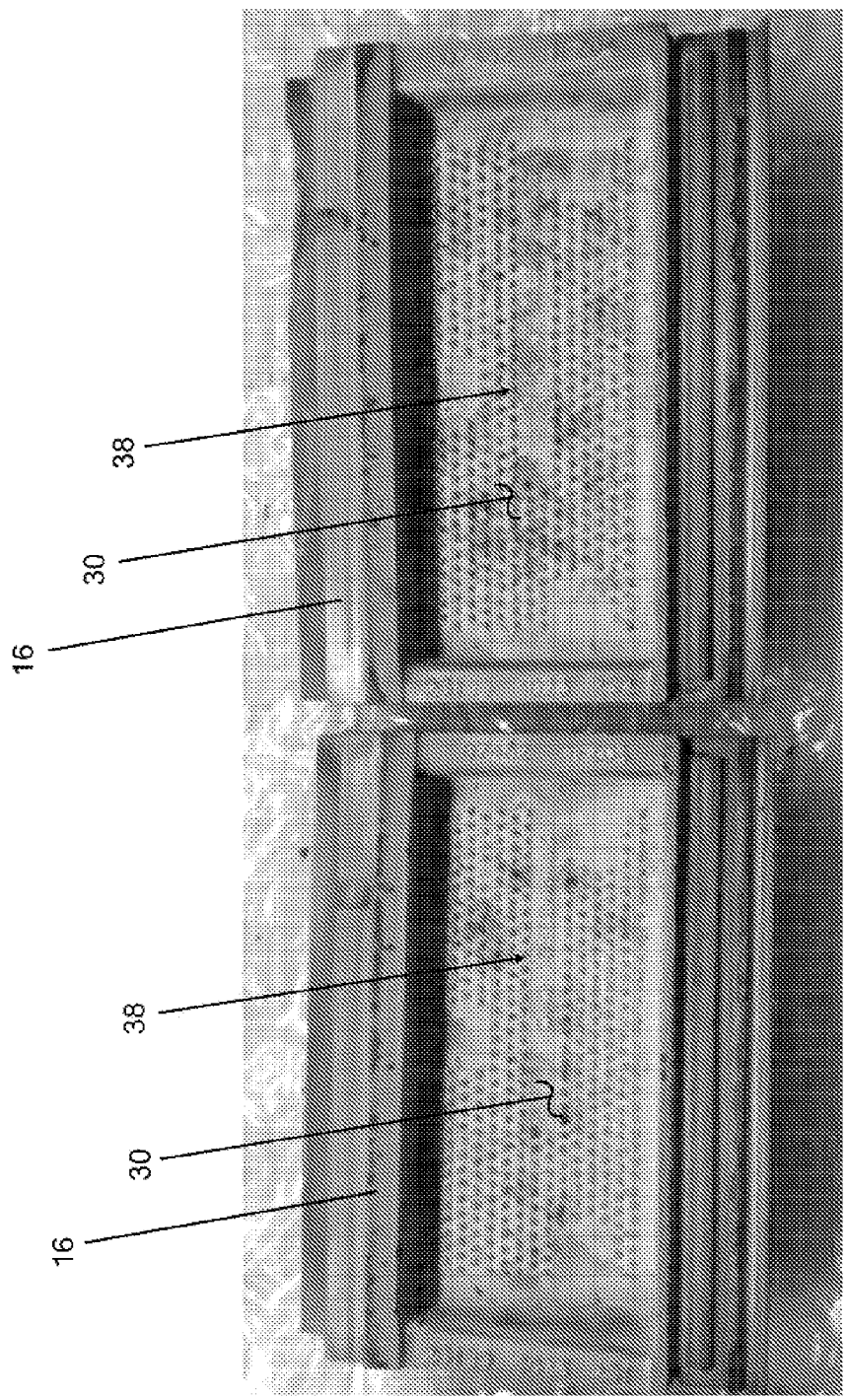
FIG. 5 is an elevational view of the impingement cooled surfaces of exemplary shrouds of an exemplary internal impingement cooling circuit with particulate matter built up thereof.

As shown in FIGS. 4 and 5 and discussed above, during use of a turbine engine, dust, sand, dirt, debris or other foreign matter, pollutant or matter 38 that is ingested or otherwise introduced into the engine may be deposited, adhered or otherwise built up on the components of the internal impingement cooling circuits 10 and/or the components 18 or surfaces 30 that the impingement cooling circuits 10 are configured or designed to cool. As shown in FIG. 4, the front side 26 of the baffle plates 20 may include the built up matter 38 which may clog or otherwise negatively affect the cooling efficiency of the baffle plates 20. As shown in FIG. 4, depending upon the service time of the engine, the front side 26 of the baffle plates 20 may be substantially covered or overlaid with the built up matter 38, such as substantially completely covered by the built up matter 38. As also shown in FIG. 4, at least one aperture 28 of the baffle plates 20 may be partially or fully blocked, clogged or plugged with the built up matter 38. The methods and systems of cleaning turbine internal impingement cooling circuits according to the present disclosure, as described further below, may substantially remove such built up matter 38 on the front side 26 of the baffle plates 20 and/or in the apertures 28 of the baffle plates 20 of the internal impingement cooling circuits 10.

Similarly, as shown in FIG. 5, the back side or impingement cooled components, surfaces or portions 26 of the shrouds 20 (i.e., the impingement cooled components) may include the built up matter 38. In some embodiment, the back side or impingement cooled surfaces or portions 26 of the shrouds 20 may include bumps or raised portions that may tend to trap or otherwise accept the built up matter 38, as shown in FIG. 5. As also as shown in FIG. 5, the built up matter 38 on the impingement cooled surfaces or portions 26 of the cooled components 18 (e.g., shrouds) may insulate the components 18 or otherwise negatively affect the cooling efficiency of the impingement cooling via the baffle plates 20. Depending upon the service time of the engine, cooled surfaces or portions 26 of the cooled components 18 may be substantially covered or overlaid with the built up matter 38 as shown in FIG. 5, such as substantially completely covered by the built up matter 38. The methods and systems of cleaning turbine internal impingement cooling circuits according to the present disclosure, as described further below, may substantially remove such built up matter 38 on the cooled surfaces or portions 26 of the cooled components 18 of the internal impingement cooling circuits 10.

Figure 6:
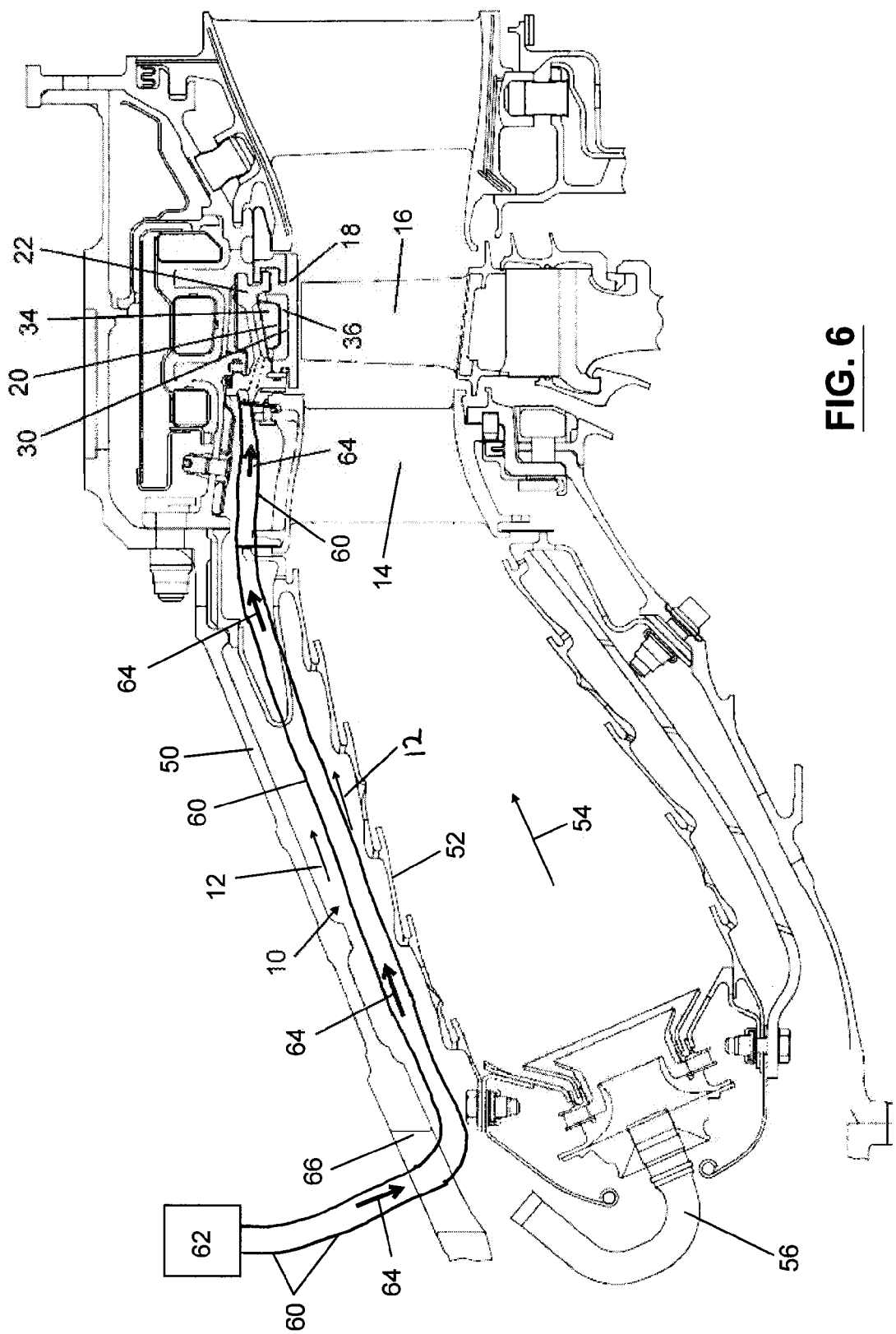
FIG. 6 is a cross-sectional view of an exemplary embodiment of a cleaning system and method according to the present disclosure installed in the internal impingement cooling circuit of FIG. 1.
Figure 7:
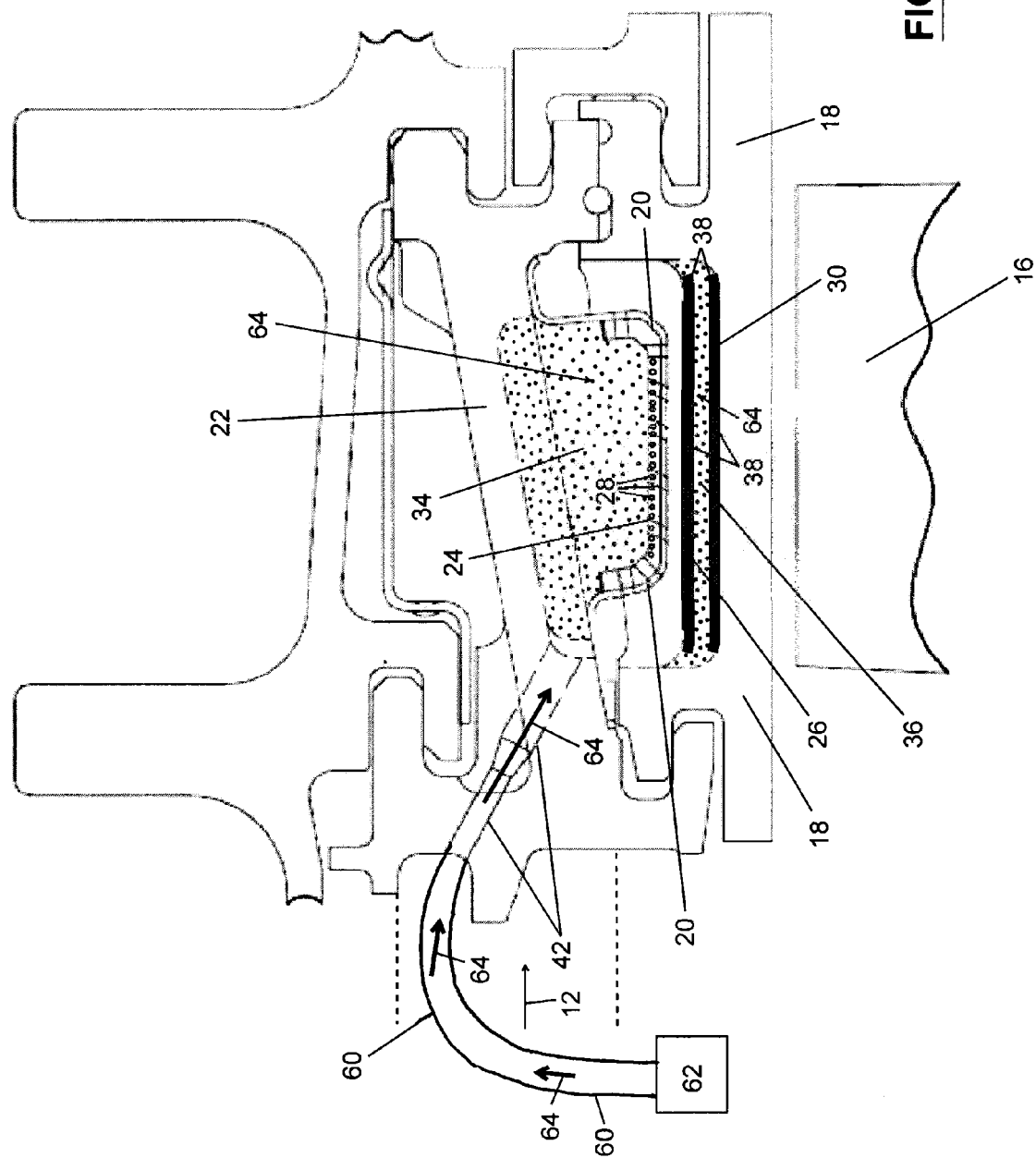
FIG. 7 is an enlarged view of the exemplary cleaning system and method of FIG. 6 during cleaning the internal impingement cooling circuit of FIG. 1.

FIGS. 6-10 illustrate methods and systems of cleaning turbine internal impingement cooling circuits according to the present disclosure for removal of the built up matter 38 on the cooled surfaces or portions 26 of the cooled components 18 of internal impingement cooling circuits 10 (as shown in FIG. 4) and/or the front side 26 of the baffle plates 20 of internal impingement cooling circuits 10 (as shown in FIG. 5) of turbine engines with detergent 64. The detergent 64 may be delivered to at least one baffle plate 20 that is used for impingement cooling in the turbine engine (e.g., in a high pressure section of a gas turbine engine), as shown in FIGS. 6 and 7. For example, in some embodiments the systems and methods are configured to introduce detergent 64 to a pre-baffle cavity 34 or otherwise proximate to a back side 24 of at least one baffle plate 20 of a turbine engine such that the detergent 64 passes through the apertures 28 in the baffle plate 20 and acts at least upon the component 18 that the baffle plate 20 is configured to air cool to clean built up matter 38 from the component 18.

Detergent 64 may be delivered to the pre-baffle cavity 34 or proximate to the back side 24 of at least one baffle plate 20 via a detergent delivery mechanism 60, as shown in FIG. 6. The detergent delivery mechanism 60 may provide a passageway or other detergent transportation mechanism or vehicle at least partially through the turbine internal impingement cooling circuits 10 to a pre-baffle cavity 34 or otherwise proximate to a back side 24 of at least one baffle plate 20 of a turbine engine. The detergent delivery mechanism 60 may be flexible, bendable, adaptable or adjustable hose, tube or tube-like mechanism that can be passed through one or more portions of the turbine engine and to a pre-baffle cavity 34 or otherwise proximate to a back side 24 of at least one baffle plate 20, and deliver detergent 64 thereto. The detergent delivery mechanism 60 may be configured to attach, mate or otherwise couple with the at least one aperture 62 in at least one hanger mechanism 22 from the internal cooling passageway 12 to provide detergent 64 to the at least one aperture 62 and, ultimately, to the associated pre-baffle cavity 34 or otherwise proximate to a back side 24 of at least one baffle plate 20.

The detergent delivery mechanism 60 may extend to at least one pre-baffle cavity 34 or otherwise proximate to a back side 24 of at least one baffle plate 20 of an impingement cooling circuit 10 to provide a flow of detergent 64 thereto by extending at least partially through an internal cooling passageway 12 of the impingement cooling circuit 10. The detergent delivery mechanism 60 may access the internal cooling passageway 12, or otherwise extend to or be configured to provide detergent 64 to at least one baffle cavity 34 or proximate to a back side 24 of at least one baffle plate 20, by through an outer wall or case 50 of the engine. For example, as shown in FIG. 6, the detergent delivery mechanism 60 may extend through the outer wall or case 50 of the engine, through or along an internal cooling passageway 12, and to at least one aperture 62 in a corresponding hanger mechanism 22. However, the detergent delivery mechanism 60 may extend through an access or aperture 66 in the outer wall or case 50 of the engine and to at least one baffle cavity 34 or proximate to a back side 24 of at least one baffle plate 20 without passing through or into the internal cooling passageway 12.

The detergent delivery mechanism 60 may transmit or provide detergent 64 to the internal impingement cooling circuits 10 of a turbine engine through at least one aperture 66 in the outer wall or case 50 of the engine. In this way, the cleaning systems and methods of the present disclosure allow cleaning of the engine without removal of the engine from service and/or substantial disassembly of the engine to perform the cleaning. The at least one aperture 66 in the outer wall or case 50 of the engine utilized by the detergent delivery mechanism 60 transmit or provide detergent 64 to at least one pre-baffle cavity 34 or otherwise proximate to a back side 24 of at least one baffle plate 20 of an impingement cooling circuit 10, such as through an associated internal cooling passageway 12, may be an already existing access port in the outer wall 50 (i.e., a port that is utilized by the turbine engine for a purpose different than cleaning of the internal impingement cooling circuits 10). For example, the at least one aperture 66 in the outer wall or case 50 of the engine that the delivery mechanism 60 passes through may be a bore scope access port, fuel nozzle port or flange, ignitor port, instrumentation access port or any other pre-existing port of the engine. At least one part or mechanism utilizing the port 66 of the engine may be removed such that the port 66 is exposed or otherwise available to the delivery mechanism 60. For example, as shown in FIG. 6, at least a portion of a fuel nozzle may be removed from the respective aperture or port 66 in the outer wall 50 of the turbine engine and the delivery mechanism 60 may extend through the "open" port 66 and into the respective internal cooling passageway 12 (and, ultimately, to the respective at least one baffle cavity 34 or proximate to a back side 24 of at least one baffle plate 20. However, the at least one aperture 66 in the outer wall or case 50 of the engine utilized by the delivery mechanism 60 to provide detergent 64 to at least one baffle plate 20 may be an aperture 66 that is not pre-existing and/or that is for a purpose different other than cleaning of the internal impingement cooling circuits 10.

With the detergent delivery mechanism 60 extending through the outer wall or case 50 of the engine and to at least one baffle cavity 34 or proximate to a back side 24 of at least one baffle plate 20 (such as by extending at least partially through an internal cooling passageway 12 and to at least one aperture in an associated hanger mechanism 22), detergent 64 may be passed through or otherwise delivered by the detergent delivery mechanism 60 to the baffle plate 20 such that the detergent 64 passes through the apertures 28 in the baffle plate 20 into the post-baffle cavity 36 and is impinged or otherwise physically acts at least upon the component 18 that the respective internal impingement cooling circuit 10 is configured to cool and that has become covered or includes matter 38 that was deposited thereon during service. The detergent 64 that passes into the post-baffle cavity 36 may also act upon the front side 26 of the baffle plate 20 to remove matter 38 that also built up thereon. In this way, methods and systems of cleaning turbine internal impingement cooling circuits according to the present disclosure utilize baffle plates 20 to generate an array of detergent cleaning jets in the post-baffle cavity 36 when detergent 64 is delivered to pre-baffle plenums/cavities 34 or otherwise proximate to a back side 24 of baffle plates 20 of an impingement cooling circuit 10 to clean matter 38 from at least the components 18 that the internal impingement cooling circuits 10 are configured to cool.

To ensure such cleaning jets of detergent 64 are formed and are effective in removing the matter 38 built up on at least the components 18 that the internal impingement cooling circuits 10 are configured to cool (and, potentially, the front sides 26 of the baffle plates 20), the pressure, flow rate, temperature and other conditions or metrics of the detergent 64 delivered by the detergent delivery mechanism 60 into the post-baffle cavity 36 may be configured or controlled. For example, the delivery mechanism 60 may be in fluid connection with a source of detergent 64 that feeds or otherwise provides the detergent 64 to the detergent delivery mechanism 60. The detergent source 62 may regulate at least one of the temperature and pressure of the detergent 64 delivered by the delivery mechanism 60 to the baffle plenums/cavities 34 or otherwise proximate to the back sides 24 of the baffle plates 20 and into the post-baffle cavity 36. Detergent 64 is delivered to the baffle plenums/cavities 34 or otherwise proximate to the back sides 24 of the baffle plates 20 by the detergent source 62 and the detergent delivery mechanism 60 at pressures within the range of about 1 psi to about 1000 psi to clean matter 38 in the post-baffle cavity 36 (e.g., the components 18 that the internal impingement cooling circuits 10 are configured to cool and, potentially, the front side 26 of the baffle plates 20). However, detergent 64 may be delivered to the pre-baffle plenums/cavities 34 or otherwise proximate to the back sides 24 of the baffle plates 20 by the detergent source 62 and the detergent delivery mechanism 60 at lower pressure such that the detergent 64 is a substantially passive or stagnant fluid in the pre-baffle cavity 34 or otherwise proximate to the back side 24 of the baffle 20.

The effectiveness and/or efficiency of the jets of detergent 64 in the post-baffle cavity 36 in cleaning matter 38 built up on the components 18 that the internal impingement cooling circuits 10 are configured to cool (and, potentially, the front sides 26 of the baffle plates 20 of the internal impingement cooling circuits 10), characteristics or metrics of the jets may play a role. For example, the angle of impact of the jets of detergent 64 in the post-baffle cavity 36 may be configured to generate appropriate impact against the matter 38. Similarly, the delivery very pressure and flow rate range of the detergent 64 into the pre-baffle plenums/cavities 34 or otherwise proximate to the back sides 24 of the baffle plates 20 by the detergent source 62 and the detergent delivery mechanism 60 may be configured to establish effective and/or efficient detergent jet geometry and pattern in the post-baffle cavities 36. Other factors that may affect detergent 64 cleaning, and therefore may be configured or considered in a particular cleaning operation or cleaning system configuration, may include the pattern of apertures 28 in the baffle plate 20, the flow rate of the detergent 64 through the baffle plate 20, the number of apertures 28 in the baffle plate 20, the velocity of the detergent 64 when it exits the baffle plate 20 into the post-baffle cavity 36, the velocity of the detergent 64 when it impacts the matter 38, and the shear stress generated in the matter 38 by the detergent 64. For example, the delivery pressure and flow rate range of the detergent 64 into the pre-baffle plenums/cavities 34 or otherwise proximate to the back sides 24 of the baffle plates 20 by the detergent source 62 and the detergent delivery mechanism 60 may be configured to establish effective and/or efficient detergent jet geometry and pattern in the post-baffle cavities 36 for one or more particular impingement cooling circuit 10 such that the matter 38 built up on at least each impingement cooled surface or component 18 is cleaned uniformly over the full area thereof.

The methods and systems of cleaning turbine internal impingement cooling circuits according to the present disclosure may also include passing material other than the cleaning detergent 64 through the at least one aperture 28 of the baffle plate(s) 20 such that it is impinged at least upon the component or surface 18 that the baffle plate(s) is configured to cool before and/or after utilizing the detergent 64. For example, the methods and systems of the present disclosure may include passing at least one cycle of gases and/or liquids through the at least one aperture 28 of the baffle plate(s) 20 such that it/they is/are impinged at least upon the component or surface 18 that the baffle plate(s) is configured to cool before and/or after utilizing the detergent 64. For example, the methods and systems of cleaning turbine internal impingement cooling circuits according to the present disclosure may include passing cycles of steam, detergent 64, and liquid water through the at least one apertures 28 of at least one baffle plate 20 such that they are each impinged at least upon the component or surface 18 that the at least one baffle plate is configured to cool.

The methods and systems of cleaning turbine internal impingement cooling circuits according to the present disclosure may uniformly clean matter 38 from circumferentially arranged internal impingement cooling circuits 10, such as that illustrated in FIG. 3. The detergent delivery mechanism 60 may extend proximate to each of the circumferentially arranged baffle plates 20 to provide detergent 64 thereto for impingement cleaning of matter 38 deposited on circumferentially arranged components 18. For example, the detergent delivery mechanism 60 may be configured to introduce or provide detergent 64 to the pre-baffle cavity 34 or otherwise proximate to a back side 24 each of the circumferentially arranged baffle plates 20 of a turbine engine to effectuate uniform cleaning around the full circumference of the internal cooling passages 10 of a turbine engine. The turbine engine may be mounted or otherwise oriented with the propulsion shaft extending substantially vertically (such as during typical maintenance of turbine engines) and a substantially equal amount of detergent 64 (or delivery pressure of the detergent 64) may directed or introduced to the pre-baffle cavity 34 or otherwise proximate to a back side 24 each of the circumferentially arranged baffle plates 20 of the engine to substantially uniformly clean matter 38 from at least the components 18 that the internal impingement cooling circuits 10 of the engine are configured to impingement cool. The turbine engine may be mounted or otherwise oriented with the propulsion shaft extending substantially horizontal (such as during typical operation of turbine engines) and the amount of detergent 64 (or delivery pressure of the detergent 64) that is directed or introduced to the pre-baffle cavity 34 or otherwise proximate to a back side 24 each of the circumferentially arranged baffle plates 20 of the engine may be adjusted to compensate for gravity so as to effectuate similar detergent jet-component interactions around the full circumference of the engine to substantially uniformly clean matter 38 from at least the components 18.

Figure 8:
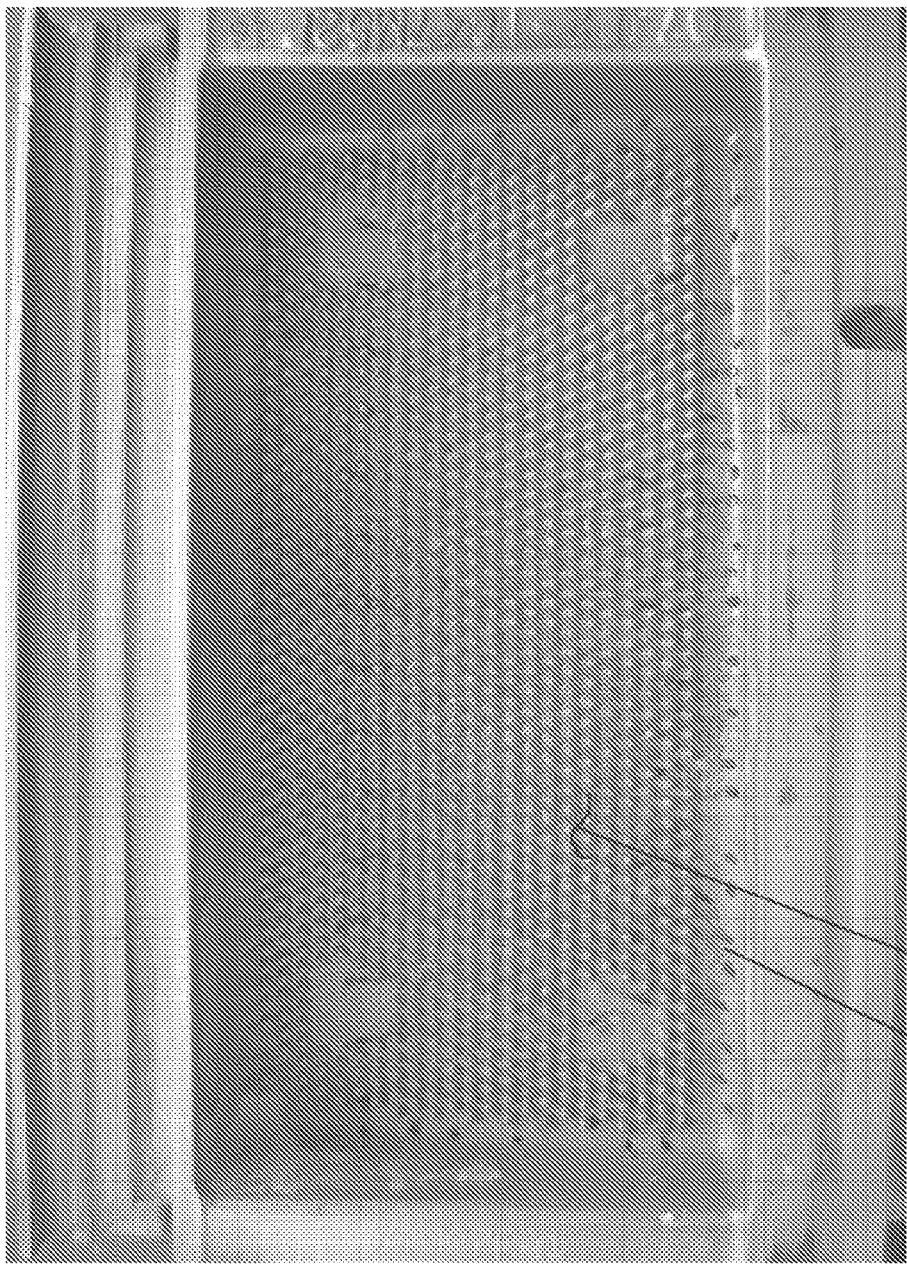
FIG. 8 is elevational view of the exemplary impingement cooled surfaces of the exemplary shrouds of FIG. 5 after an application of the exemplary cleaning system and method of FIG. 7.
Figure 9:
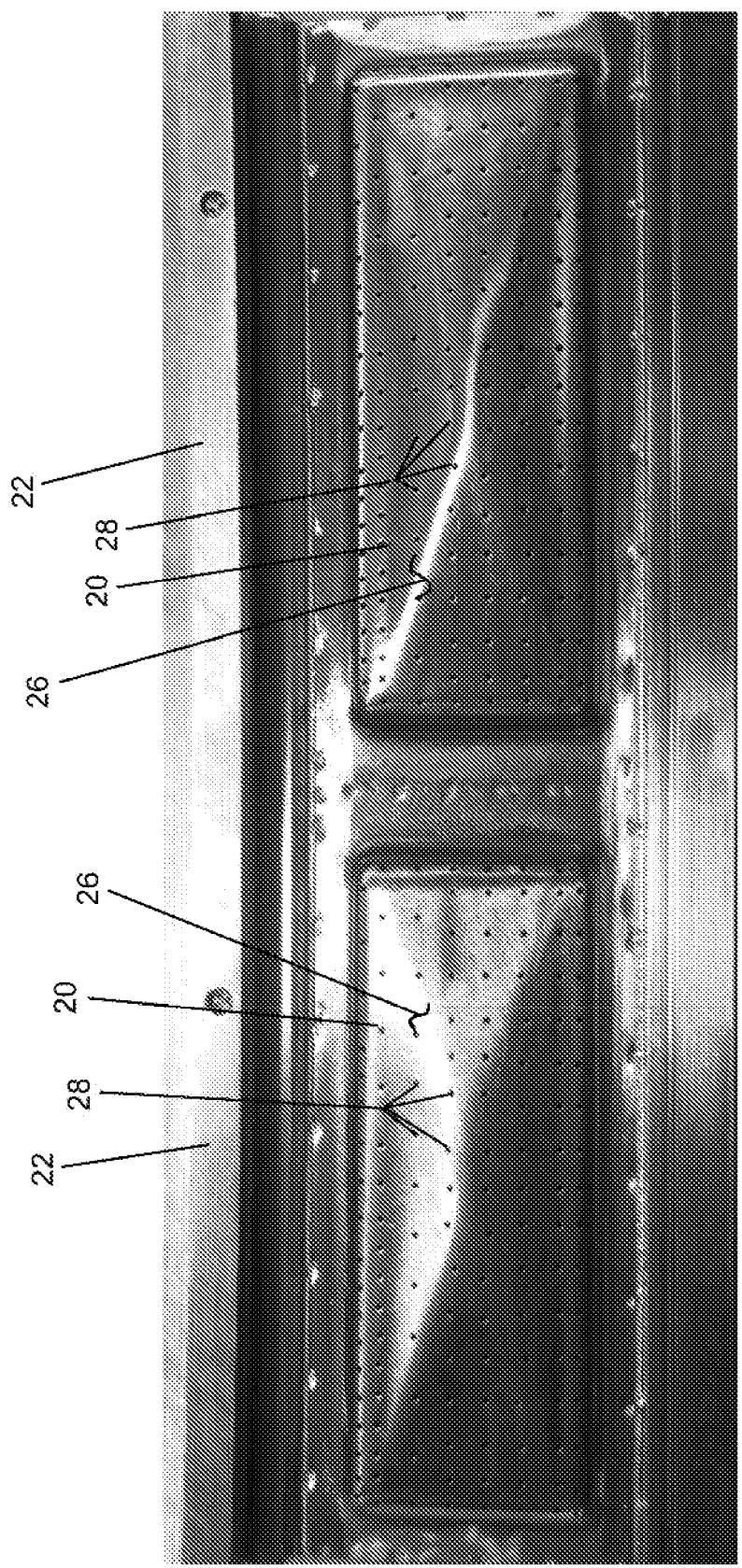
FIG. 9 is an elevational view of the exemplary baffle plates of FIG. 4 after an application of the exemplary cleaning system and method of FIG. 7.

The end result of the methods and systems of cleaning turbine internal impingement cooling circuits according to the present disclosure are shown in FIGS. 8 and 9. As shown in FIG. 8 as compared to FIG. 5, the methods and systems of cleaning turbine internal impingement cooling circuits according to the present disclosure are effective in utilizing detergent 64 to impingement clean and thereby remove matter 38 that has built up on the impingement cooled surfaces 30 of the components 18 that the baffle plates 20 of the internal impingement cooling circuits 10 are configured to impingement cool, such as impingement air cool. As shown in FIG. 8, the entirety of the impingement cooled surfaces 30 of the cooled components 18 may be substantially free of matter 38 after a cleaning operation such that the impingement cooled surfaces 30 are substantially similar to their as-manufactured condition and initial cooling efficiency (at least with respect to the lack of matter 38 thereon). Similarly, as shown in FIG. 9 as compared to FIG. 4, the methods and systems of cleaning turbine internal impingement cooling circuits according to the present disclosure are effective in utilizing detergent 64 to remove matter 38 that has built up on the front sides 26 of the baffle plates 20 of the internal impingement cooling circuits 10 that are configured to impingement cool, such as impingement air cool. As shown in FIG. 9, the entirety of the front sides 26 of the baffle plates 20 adjacent or proximate to the impingement cooled surfaces 30 of the cooled components 18 may be substantially free of matter 38 after a cleaning operation such that the front sides 26 of the baffle plates 20 are substantially similar to their as-manufactured condition and initial cooling efficiency (at least with respect to the lack of matter 38 thereon).

Figure 10:
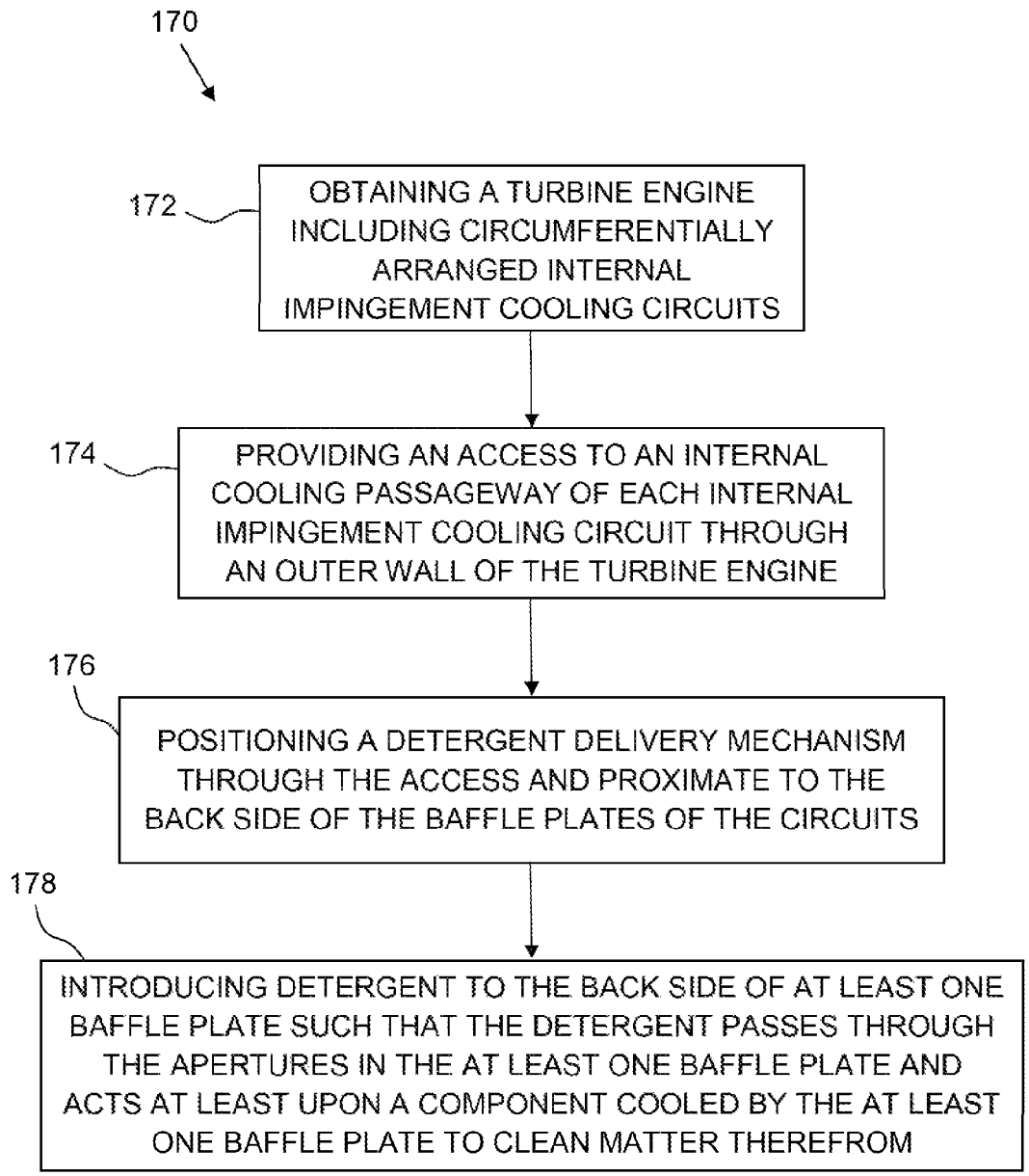
FIG. 10 is a flow chart illustrating an exemplary method of cleaning an internal impingement cooling circuit of a turbine engine according to the present disclosure.

As shown in FIG. 10, an exemplary method of cleaning turbine internal impingement cooling circuits 170 according to the present disclosure may include obtaining 172 a turbine engine including circumferentially arranged internal impingement cooling circuits. Each internal impingement cooling circuit may include with a baffle plate configured to air impingement cool a respective circumferentially arranged component of the turbine engine. Each baffle plate may include a back side, a front side positioned proximate to the respective impingement cooled component, and apertures extending from the front side to the back side. The method of cleaning turbine internal impingement cooling circuits 170 may also include providing 174 an access to an internal cooling passageway of each of the circumferentially arranged internal impingement cooling circuits through an outer wall of the turbine engine, as shown in FIG. 10. Providing 174 an access to an internal cooling passageway may include exposing or otherwise forming or providing a port or aperture through the outer wall of the turbine engine. As also shown in FIG. 10, the method of cleaning turbine internal impingement cooling circuits 170 may also include positioning 176 a detergent delivery mechanism through the access in the outer wall of the turbine, into the internal cooling passageway, and proximate to the back sides of the baffle plates. Positioning 176 a detergent delivery mechanism proximate to the back sides of the baffle plates may include positioning or arranging the detergent delivery mechanism proximate in fluid communication with a pre-baffle cavity associated with each baffle plate of each internal impingement cooling circuit, such as via an aperture in a hanger mechanism forming a pre-baffle cavity in concert with a respective baffle plate.

As also shown in FIG. 10, the method of cleaning turbine internal impingement cooling circuits 170 may also include introducing 178 detergent to a back side of at least one baffle plate of the turbine engine such that the detergent passes through apertures in the at least one baffle plate and acts at least upon the at least one component that the at least one baffle plate is configured to air cool to clean matter from the at least one component. Introducing 178 the detergent may be accomplished via the detergent delivery mechanism. Introducing 178 detergent to a back side of at least one baffle plate of the turbine engine includes introducing the detergent such that the detergent passes through apertures in the at least one baffle plate and acts on the at least one component that the at least one baffle plate is configured to air cool and the front side of the at least one baffle plate to clean matter therefrom. Cycles of steam, detergent, and liquid water may be passed through the apertures in the at least one baffle plate and impinged at least upon the at least one component that the at least one baffle plate is configured to air cool to clean matter from the at least one component.

EXAMPLES

The methods and systems of cleaning turbine internal impingement cooling circuits, having been generally described, may be more readily understood by reference to the following examples, which are included merely for purposes of illustration of certain aspects and embodiments, and are not intended to limit the methods and systems in any way.

In the examples, the methods and systems of cleaning turbine internal impingement cooling circuits of the present disclosure were performed on internal impingement cooling circuits of an aircraft turbine engine that were configured to impingement cool the high-pressure shrouds of the engine. The back side(s) or rear surface(s) of the shrouds were therefore cooled by the impingement cooling air of the internal impingement cooling circuits during normal operation of the engine. As a result, particulate matter (such as dust and debris) was deposited or built up on the back side(s) or rear surface(s) of the shrouds, thereby substantially reducing the heat transfer effectiveness of the impingement cooling circuits and leading to an undesirable increase in the flow path surface temperature of the shrouds during use of the engine. As such, the example cooling methods and systems were performed to impingement clean the back side(s) or rear surface(s) of the shrouds, and the front sides of the baffle plates of the circuits, with detergent.

Example 1

Tests of the delivery methods and system of the present disclosure were performed, in part, to analyze the effect of detergent flow rate on detergent shroud wetting and, ultimately, shroud cleaning. The flow through the baffle was also analyzed tested to ensure sufficient pressure of the impingement fluid through the apertures in the baffle plate at the front side of the baffle plate, so that each jet in the arrangement was essentially normal to the surface of the shroud for all positions around the full circumference of the circumferentially arranged shroud assembly in the engine.

The velocity of the impingement fluid through the shroud hanger apertures was about 1.3 m/s, and the velocity of the impingement fluid through the baffle apertures was about 0.4 m/s. In order to assess flow through the baffle plate apertures and the impingement of the detergent jets on the back side of the shroud, testing was performed with the shroud removed from the shroud hanger.

Wetting tests were also performed for shrouds attached to the shroud hanger in order to determine the uniformity of potential cleaning as a function of orientation or position around the full circumference of the engine (i.e., circumferentially arranged cooling circuits cooling circumferentially arranged shrouds). Specifically, shrouds at three positions around the circumference of the engine, positioned at about 3 o'clock, about 6 o'clock, and about 9 o'clock, were tested to determine the effect of position or orientation on detergent flow (i.e., simulating orientation of an engine oriented substantially horizontal). The shrouds were initially exposed separately to 4 detergent flow rates of 400, 600, 800, and 1000 ml/minute for 30 seconds. Detergent flow rates as high as 2000 ml/minute were also explored. The dust or matter-loaded surfaces of the shroud appeared darker when exposed to the detergent. Detergent wetting was used as a gauge of the uniformity of the exposure of the dust or matter on the shroud surface to the detergent during cleaning. The cleaning uniformity over each full shroud, as well as uniformity of cleaning from shroud to shroud, was analyzed. It was determined therefrom that the 400 ml/minute flow rate was needed to wet substantially all of the surface area of the shroud oriented at the 12 o'clock position, the 800 ml/minute flow rate was needed for the shroud positioned or oriented at the 6 o'clock position, and the 1000 ml/minute flow rate was needed for the shroud positioned or oriented at the 3 o'clock position.

A 30 second exposure of the 1000 ml/minute detergent flow rate was then tested on shrouds arranged or oriented for every clock position around the circumference of the engine (i.e., simulating orientation of an engine oriented substantially horizontal). For the 30 second exposure of the fluid at the 1000 ml/minute detergent flow rate, it was determined that almost all the surface area of every shroud was wetted by the detergent. The shrouds that showed the least wetting included those at the 2 o'clock, 5 o'clock, 7 o'clock, and 10 o'clock positions. It was noted that an exposure time greater than the tested 30 second exposure time would improve wetting uniformity about the circumference of the engine.

Example 2

Tests were also performed to assess the cleaning effectiveness of the delivery methods and system of the present disclosure on an actual aircraft engine assembly.

A set of shrouds was removed from a wide-body aircraft engine that had operated for about 1000 cycles in environmental conditions that contained a relatively high concentration of airborne particulate, such as PM10 values of greater than about 80 micro grams per cubic meter, for example. The shrouds were then photographed, and assessed/measured for the degree of degradation, including flow path condition, cooling hole condition/performance, and the degree of particulate matter on the back side or impingement cooled surface of the shrouds. The shrouds were then re-assembled into the same engine position/configuration and the whole shroud assembly in the circumferential shroud hanger assembly was then subjected to a cleaning sequence of steam, detergent, and water, in order to test removal of the particulate matter from the back-side or impingement cooled surface of the shrouds.

Cleaning detergent was delivered to the hanger members, baffle plates and, ultimately, the shrouds utilizing the delivery method or system of the present disclosure in order to generate uniform cleaning of the shrouds around the full circumference of the turbine engine. The detergent was delivered to the apertures in the hanger members such that a flow rate of about 1000 ml/minute was provided to each shroud (i.e., at the post-baffle cavity) for cleaning each shroud impingement cooled surface at every position around the full circumference of the engine. For each hanger member there were two apertures for the specific engine that was cleaned. Hence, the flow rate was about 500 ml/minute through each hanger aperture. The flow conditions and flow rate delivered to the apertures of the shroud hanger members generated an arrangement of jets through the baffle plates and into the post-baffle cavity.

More specifically, cleaning tests were performed using a series of steam and/or detergent cycles to form a full cleaning cycle. Superheated steam was utilized through the system to pre-heat the part to be cleaned (i.e., the back side or impingement cooled surface of the shrouds), and detergent was utilized through the system to selectively dissolve the oxide-based, chloride-based, sulfate-based, and carbon-based constituents of the foreign material built up on the shrouds.

A first sequence included an application of superheated steam at a temperature of about 105° C. for about 16 minutes. A second sequence included an application of about 35-times diluted Citranox® at a flow rate of about 1000 mL/min for each shroud, at a temperature of greater than about 70° C. for a duration of about 5 minutes. After the application of Citranox®, an application of superheated steam at temperature of greater than about 105° C. for about 16 minutes was utilized. A third sequence included an application of about 35-times diluted Citranox® at a flow rate of about 1000 mL/min for each shroud, at a temperature of about 80° C. for a duration of about 5 minutes, and an application of superheated steam at temperature of greater than about 105° C. and for a duration of about 16 minutes. A fourth sequence included an application of about 35-times diluted Citranox® at a flow rate of about 1000 mL/min for each shroud, at a temperature of greater than about 70° C. for a duration of about 5 minutes. A fourth sequence included an application of water at a flow rate of about 1000 mL/min for each shroud, at a temperature of about 20° C. for a duration of about 20 minutes. As there were forty (40) total shrouds in the full circumferential engine assembly, the total flow rate of detergent delivered to the engine to generate uniform circumferential cleaning was about 40,000 mL/min.

After completion of this full cleaning cycle, the shrouds were removed from the turbine engine and examined after drying. For example, the condition of the shrouds were assessed and/or measured, including the flow path condition, cooling aperture condition/performance, and the degree of particulate matter on the back side or impingement cooled surface of the shrouds.

It was found that the cleaning system and method provided substantially uniform distribution of detergent over the whole rear or impingement cooled surface of the shrouds. It was also found that the cleaning system and method provided substantially uniform removal of dust, debris or particulate matter on the impingement cooled surface using the cleaning sequence described below. For example, it was determined that more than about 85 percent by mass of the original dust or particulate matter had been removed from the shrouds, and there was uniform removal of the dust over the full surface of each shroud. It was thereby concluded that the arrangement of detergent cleaning jets, the flow rate of detergent, and the cleaning cycles used to clean the shrouds within the engine had provided uniform cleaning of the shrouds. In addition, it was determined that each shroud around the circumference of the engine was cleaned to a similar degree of dust removal. Hence, is was concluded that the arrangement of detergent cleaning jets, the flow rate of detergent, and the cleaning cycles used to clean the shrouds within the engine had provided uniform circumferential cleaning of the circumferentially arranged impingent cooled surfaces or portions of the shrouds of the turbine engine.

It is to be understood that the above description is intended to be illustrative, and not restrictive. Numerous changes and modifications may be made herein by one of ordinary skill in the art without departing from the general spirit and scope of the inventions as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the inventions have been described in detail in connection with only a limited number of embodiments, it should be readily understood that the inventions are not limited to such disclosed embodiments. Rather, the inventions can be modified to incorporate any number of variations, alterations, substitutions or equivalent arrangements not heretofore described, but which are commensurate with the spirit and scope of the inventions. Additionally, while various embodiments of the inventions have been described, it is to be understood that aspects of the disclosure may include only some of the described embodiments. Accordingly, the inventions are not to be seen as limited by the foregoing description, but are only limited by the scope of the appended claims.

This written description uses examples to disclose the inventions, including the best mode, and also to enable any person skilled in the art to practice the inventions, including making and using any devices or systems and performing any incorporated methods. The patentable scope of the inventions are defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of cleaning a turbine engine that includes a plurality of internal impingement cooling circuits, each with a baffle plate, the plurality of internal impingement cooling circuits configured to air cool a respective circumferentially arranged component of the turbine engine, the method comprising:

introducing detergent to a back side of each baffle plate of the turbine engine such that the detergent passes through at least one aperture in each baffle plate and acts at least upon the circumferentially arranged component that the baffle plate is configured to air impingement cool to clean matter from the circumferentially arranged component; and adjusting the amount of detergent introduced to the back side of each baffle plate to compensate for gravity and thereby effectuate uniform detergent jet-component interactions around a full circumference of the engine to uniformly clean matter from the circumferentially arranged component.

2. The cleaning method of claim 1, wherein introducing detergent to a back side of a baffle plate of the turbine engine comprises introducing detergent into a pre-baffle cavity positioned proximate to the back side of the baffle plate.

3. The cleaning method of claim 1, further comprising accessing the back side of the baffle plate of the turbine engine through a port in an outer wall of the turbine engine.

4. The cleaning method of claim 3, wherein the port in the outer wall of the turbine engine provides a passageway to an internal cooling air channel of a respective internal impingement cooling circuit that feeds the baffle plate with air to air cool the component.

5. The cleaning method of claim 3, wherein the port is an aperture in an outer case of the turbine engine configured to house a fuel line coupled to a fuel nozzle.

6. The cleaning method of claim 3, wherein accessing a back side of a baffle plate of the turbine engine through a port in an outer wall of the turbine engine includes positioning a detergent delivery mechanism through the port and proximate to the back side of the baffle plate.

7. The cleaning method of claim 1, wherein the component is a shroud coupled to a shroud hanger positioned at least partially on the back side of the shroud.

8. The cleaning method of claim 7, wherein the detergent is passed through at least one aperture in the hanger and is introduced into a pre-baffle cavity formed between the hanger and the back side of the shroud.

9. The cleaning method of claim 1, wherein the detergent acts on a front side of the baffle plate that substantially faces the component that the baffle plate is configured to air impingement cool.

10. The cleaning method of claim 1, wherein the detergent includes an acidic, water-based reagent including an organic surfactant and a corrosion inhibitor designed to selectively dissolve at least one of sulfate, chloride and carbonate based species while being substantially unreactive with the material forming the component.

11. The cleaning method of claim 1, wherein the turbine engine is attached to an aircraft.

12. The cleaning method of claim 1, further comprising substantially simultaneously introducing detergent to the back side of each baffle plate such that the detergent passes through the at least one aperture in the baffle plate and acts upon the respective circumferentially arranged component that the baffle plate is configured to air cool.

13. The cleaning method of claim 1, further comprising introducing detergent to a back side of a baffle plate of the turbine engine such that the detergent passes through a plurality of apertures in the baffle plate to form a plurality of discrete jets of detergent that act at least upon the component that the baffle plate is configured to air impingement cool to clean matter from the component.

14. A method of cleaning a turbine engine, the method comprising:

obtaining a turbine engine including a plurality of circumferentially arranged internal impingement cooling circuits each with a baffle plate configured to air impingement cool a respective circumferentially arranged component of the turbine engine, wherein the baffle plates each include a back side, a front side positioned proximate to the respective component, and at least one aperture extending from the front side to the back side;

positioning a detergent delivery mechanism through at least one access aperture in the outer wall of the turbine and proximate to the back side of the baffle plates;

introducing detergent to the back side of the baffle plates via the detergent delivery mechanism such that the detergent passes through the at least one aperture in the baffle plates and acts upon the components and the front sides of the baffle plates to clean matter therefrom, and adjusting the amount of detergent introduced to the back side of the baffle plates to compensate for gravity and thereby effectuate uniform detergent jet-component interactions around a full circumference of the engine to uniformly clean matter from the circumferentially arranged components.

15. The cleaning method of claim 14, wherein the components are circumferentially arranged shrouds each coupled to a shroud hanger positioned at least partially on the back side of the shrouds, and wherein the method further comprises passing the detergent through an aperture in each of the hangers and into a pre-baffle cavity formed between the hangers and the back sides of the baffle plates.

16. The cleaning method of claim 15, wherein the aperture in each of the hangers is in communication with a respective internal cooling passageway of a respective circumferentially arranged internal impingement cooling circuit to feed air to a respective baffle plate to air cool a respective component.

17. The cleaning method of claim 14, wherein the turbine engine is attached to an aircraft.

18. The cleaning method of claim 14, wherein the detergent includes an acidic, water-based reagent including an organic surfactant and a corrosion inhibitor designed to selectively dissolve at least one of sulfate, chloride and carbonate based species while being substantially unreactive with the material forming the components.

* * * * *